United States Patent
Krishnan

(10) Patent No.: US 7,292,826 B2
(45) Date of Patent: Nov. 6, 2007

(54) SYSTEM AND METHOD FOR REDUCING RAKE FINGER PROCESSING

(75) Inventor: Ranganathan Krishnan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 642 days.

(21) Appl. No.: 10/903,814

(22) Filed: Jul. 29, 2004

(65) Prior Publication Data

US 2006/0025082 A1 Feb. 2, 2006

(51) Int. Cl.
H04B 7/00 (2006.01)
H04B 1/00 (2006.01)

(52) U.S. Cl. .................. 455/70; 455/522; 370/318; 375/347

(58) Field of Classification Search ............. 455/70, 455/522, 504, 509, 508, 513, 528, 67.11, 455/67.13, 67.16, 130, 133–134, 137, 143, 455/161.1, 161.2–161.3, 225, 226.1–226.3; 375/130, 247, 13.6, 14.7, 180; 370/335, 370/342, 318, 331
See application file for complete search history.

(56) References Cited

U.S. PATENT DOCUMENTS

| | | | |
|---|---|---|---|
| 6,157,687 A * | 12/2000 | Ono .......................... 375/347 |
| 6,292,519 B1 * | 9/2001 | Popovic ..................... 375/346 |
| 6,377,614 B1 | 4/2002 | Yamashita .................. 375/149 |
| 6,625,197 B1 | 9/2003 | Lundby et al. ............. 375/130 |
| 6,717,976 B1 | 4/2004 | Shen .......................... 375/147 |
| 2001/0036222 A1 * | 11/2001 | Doetsch et al. ............ 375/148 |
| 2003/0091103 A1 | 5/2003 | Sendonaris |
| 2003/0152167 A1 | 8/2003 | Oh et al. |
| 2004/0097204 A1 * | 5/2004 | Jung et al. .................. 455/132 |
| 2004/0141469 A1 * | 7/2004 | Jung et al. .................. 370/281 |
| 2004/0153679 A1 * | 8/2004 | Fitton et al. ................ 713/322 |
| 2005/0111526 A1 * | 5/2005 | Bilgic et al. ............... 375/147 |
| 2006/0209761 A1 * | 9/2006 | Moshavi et al. ........... 370/331 |
| 2006/0251153 A1 * | 11/2006 | Noerklit .................... 375/148 |
| 2006/0274819 A1 * | 12/2006 | Bengtsson ................. 375/147 |

FOREIGN PATENT DOCUMENTS

WO    WO 01/01601 A1    1/2001

* cited by examiner

Primary Examiner—Pablo N. Tran
(74) Attorney, Agent, or Firm—Albert J. Harnois, Jr.; Jonathan T. Velasco; Thomas R. Rouse

(57) ABSTRACT

Systems and techniques are disclosed relating to reducing the number of fingers in a rake receiver used for rake finger processing in wireless networks. Determining $E_{before}$, captured energy of all fingers before increasing transmit power. Increasing transmit power by a delta transmit power. Determining $E_{after}$, captured energy of i fingers. Determining i fingers needed for processing, such that $E_{after}$ is essentially greater than or equal to $E_{before}$.

7 Claims, 4 Drawing Sheets

SYSTEM AND METHOD FOR REDUCING RAKE FINGER PROCESSING

BACKGROUND

1. Field

The present disclosure relates generally to wireless communications, and more specifically, to various systems and techniques for reducing rake finger processing in wireless networks.

2. Background

Communication systems designed to allow multiple users to access a common communications medium may be based on code division multiple access (CDMA), time division multiple access (TDMA), frequency division multiple access (FDMA), space division multiple access (SDMA), polarization division multiple access (PDMA), or other modulation techniques known in the art. These modulation techniques demodulate signals received from multiple users of a communication system, thereby enabling an increase in the capacity of the communication system. In connection therewith, various wireless systems have been established including, e.g., Advanced Mobile Phone Service (AMPS), Global System for Mobile communication (GSM), and some other wireless systems.

In conventional wireless communications, an access network is generally employed to support communications for a number of devices. An access network is typically implemented with multiple fixed site base stations dispersed throughout a geographic region. The geographic region is generally subdivided into smaller regions known as cells. Each base station may be configured to serve the devices in its respective cell. An access network may not be easily reconfigured when there are varying traffic demands across different cellular regions.

In contrast to the conventional access network, ad-hoc networks are dynamic. An ad-hoc network may be formed when a number of wireless communication devices, often referred to as terminals, join together to form a network. Terminals in ad-hoc networks can operate as either a host or router. Thus, an ad-hoc network may be easily reconfigured to meet existing traffic demands in a more efficient fashion. Moreover, ad-hoc networks do not require the infrastructure required by conventional access networks, making ad-hoc networks an attractive choice for the future.

In a conventional CDMA communications system, a subscriber station may access a network, or communicate with other subscriber stations, through one or more base stations. A subscriber station can also be called a terminal. Each base station is configured to serve all subscriber stations in a specific geographic region generally referred to as a cell. In some high traffic applications, the cell may be divided into sectors with a base station serving each sector. Each base station transmits a pilot signal which is used by the subscriber stations for synchronizing with a base station and to provide coherent demodulation of the transmitted signal once the subscriber station is synchronized to the base station. The subscriber station generally establishes a communications channel with the base station having the strongest pilot signal.

The subscriber station calculates a signal-to-noise-and-interference ratio C/I for a received forward link signal. The forward link refers to transmission from the base station to a subscriber station and the reverse link refers to transmission from the subscriber station to a base station. The subscriber station's C/I determine the data rate that can be supported for the forward link from the base station to a subscriber station. That is, a given level of performance for the forward link is achieved at a corresponding level of C/I. A method and apparatus for selecting a data rate is disclosed in U.S. Pat. No. 6,574,211 entitled "METHOD AND APPARATUS FOR HIGH RATE PACKET TRANSMISSION," issued Jun. 3, 2003, which is assigned to the assignee of the present invention.

The power at which a base station transmits data to a subscriber station is called the forward link transmit power. The forward link transmit power is at a level required for transmitting data over the forward link reliably. Likewise, the power at which a subscriber station transmits data to a base station is called the reverse link transmit power. The reverse link transmit power is at a level required for transmitting data over the reverse link reliably.

Interference to each subscriber station increases as the number of subscriber stations transmitting increases. Thus, it is desirable to control subscriber station transmit power to avoid adverse interference with other subscriber station communications.

Ultra-Wideband (UWB) is an example of a communications technology that may be implemented with ad-hoc networks. UWB provides high speed communications over a wide frequency bandwidth. At the same time, UWB signals are transmitted in very short pulses that consume very little power. The output power of the UWB signal is so low that it looks like noise to other RF technologies, making it less interfering.

In an ad-hoc network, terminals are added dynamically. As more terminals are added, each communicating terminal creates more interference for terminals other than the terminal with which it is communicating. Thus, it is desirable to control terminal transmit power to avoid adverse interference with other terminal communications.

A wireless communication system, whether convention or ad-hoc, that utilizes a rake receiver, diversity combines separable multipaths. In a rake receiver, a demodulation element, or "finger" is assigned to a multipath. When receive power consumption is dominated by the power consumption in the rake fingers, a system and method that reduces rake finger processing also significantly reduces power consumption.

Thus, what is needed is a system and method to reduce rake finger processing to reduce power consumption in the communication system.

SUMMARY

In one aspect, a method of reducing the number of fingers in a rake receiver, comprises determining $E_{before}$, captured energy of all fingers before increasing transmit power, increasing transmit power by a delta transmit power, determining $E_{after}$, captured energy of i fingers, and determining i fingers needed for processing, such that $E_{after}$ is essentially greater than or equal to $E_{before}$.

In an aspect, the delta transmit power is 3 dB. In another aspect, the delta transmit power is based on a desired reduction in receive power consumption. In yet another aspect, the delta transmit power is based on a signal-to-interference-and-noise ratio (SINR). In a further aspect, the delta transmit power is based on a multipath power profile.

It is understood that other embodiments of the present invention will become readily apparent to those skilled in the art from the following detailed description, wherein various embodiments of the invention are shown and described by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

Figure 1:
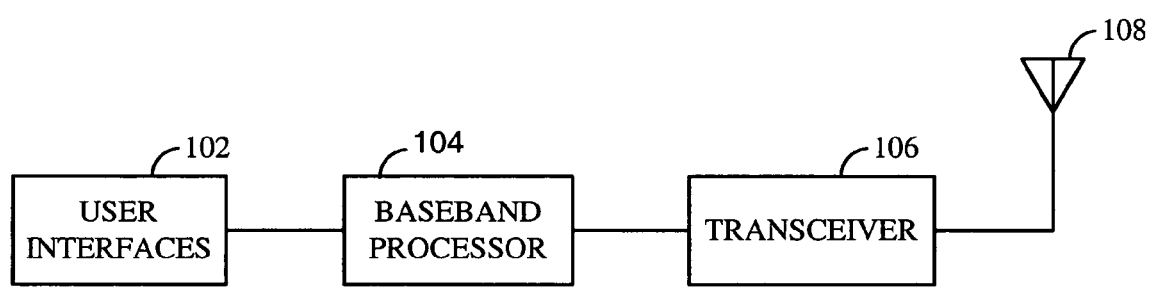
FIG. 1 is a functional block diagram illustrating an example of a terminal.

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. Acronyms and other descriptive terminology may be used merely for convenience and clarity and are not intended to limit the scope of the invention.

The word "exemplary" is used exclusively herein to mean "serving as an example, instance, or illustration." An embodiment described herein as "exemplary" is not necessarily to be construed as preferred or advantageous over other embodiments.

In the following detailed description, various aspects of the present invention may be described in the context of a CDMA wireless communications system. While these inventive aspects may be well suited for use with this application, those skilled in the art will readily appreciate that these inventive aspects are likewise applicable for use in various other communication environments including convention wireless communications. Accordingly, any reference to a CDMA communications system is intended only to illustrate the inventive aspects, with the understanding that such inventive aspects have a wide range of applications.

The CDMA technique has many advantages. An exemplary CDMA system is described in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present invention.

The CDMA modulation techniques discussed in the '307 patent and in U.S. Pat. No. 5,102,459 entitled "SYSTEM AND METHOD FOR GENERATING SIGNAL WAVEFORMS IN A CDMA CELLULAR TELEPHONE SYSTEM," assigned to the assignee of the present invention, mitigate the special problems of the terrestrial channel, such as multipath and fading. Instead of being an impediment to system performance, as it is with narrowband systems, separable multipaths can be diversity combined in a mobile rake receiver for enhanced modem performance. The use of a RAKE receiver for improved reception of CDMA signals is disclosed in U.S. Pat. No. 5,109,390, entitled "DIVERSITY RECEIVER IN A CDMA CELLULAR TELEPHONE SYSTEM," assigned to the assignee of the present invention. In the mobile radio channel, multipath is created by reflection of the signal from obstacles in the environment, such as buildings, trees, cars, and people. In general the mobile radio channel is a time varying multipath channel due to the relative motion of the structures that create the multipath. For example, if an ideal impulse is transmitted over the time varying multipath channel, the received stream of pulses would change in time location, attenuation, and phase as a function of the time that the ideal impulse was transmitted.

The multipath properties of the terrestrial channel produce, at the receiver, signals having traveled several distinct propagation paths. One characteristic of a multipath channel is the time spread introduced in a signal that is transmitted through the channel. As described in the '390 patent, the spread spectrum pseudonoise (PN) modulation used in a CDMA system allows different propagation paths of the same signal to be distinguished and combined, provided the difference in path delays exceeds the PN chip duration. If a PN chip rate of approximately 1 MHz is used in a CDMA system, the full spread spectrum processing gain, equal to the ratio of the spread bandwidth to the system data rate, can be employed against paths having delays that differ by more than one microsecond. A one microsecond path delay differential corresponds to a differential path distance of approximately 300 meters.

Another characteristic of the multipath channel is that each path through the channel may cause a different attenuation factor. For example, if an ideal impulse is transmitted over a multipath channel, each pulse of the received stream of pulses generally has a different signal strength than other received pulses.

Yet another characteristic of the multipath channel is that each path through the channel may cause a different phase on the signal. If, for example, an ideal impulse is transmitted over a multipath channel, each pulse of the received stream of pulses generally has a different phase than other received pulses. This can result in signal fading.

A fade occurs when multipath vectors are added destructively, yielding a received signal that is smaller than either individual vector. For example, if a sine wave is transmitted through a multipath channel having two paths where the first path has an attenuation factor of X dB, a time delay of d with a phase shift of Q radians, and the second path has an attenuation factor of X dB, a time delay of d with a phase shift of Q+□ radians, no signal would be received at the output of the channel.

As described above, in current CDMA demodulator structures, the PN chip interval defines the minimum separation two paths must have in order to be combined. Before the distinct paths can be demodulated, the relative arrival times (or offsets) of the paths in the received signal must first be determined. The demodulator performs this function by "searching" through a sequence of offsets and measuring the energy received at each offset. If the energy associated with a potential offset exceeds a certain threshold, a demodulation element, or "finger" may be assigned to that offset. The signal present at that path offset can then be summed with the contributions of other fingers at their respective offsets.

FIG. 1 is a conceptual block diagram illustrating a possible configuration of a terminal. As those skilled in the art will appreciate, the precise configuration of the terminal may vary depending on the specific application and the overall design constraints.

The terminal may be implemented with a front end transceiver 102 coupled to an antenna 104. A baseband processor 106 may be coupled to the transceiver 102. The baseband processor 106 may be implemented with a software based architecture, or other type of architecture. A microprocessor may be used as a platform to run software programs that, among other things, provide control and overall system management functions that allow the terminal to operate either as a master or member terminal. A digital signal processor (DSP) may be implemented with an embedded communications software layer which runs application specific algorithms to reduce the processing demands on the microprocessor. The DSP may be used to provide various signal processing functions such as pilot signal acquisition, time synchronization, frequency tracking, spread-spectrum processing, modulation and demodulation functions, and forward error correction.

The terminal may also include various user interfaces 108 coupled to the baseband processor 106. The user interfaces may include a keypad, mouse, touch screen, display, ringer, vibrator, audio speaker, microphone, camera and/or other input/output devices.

Figure 2:
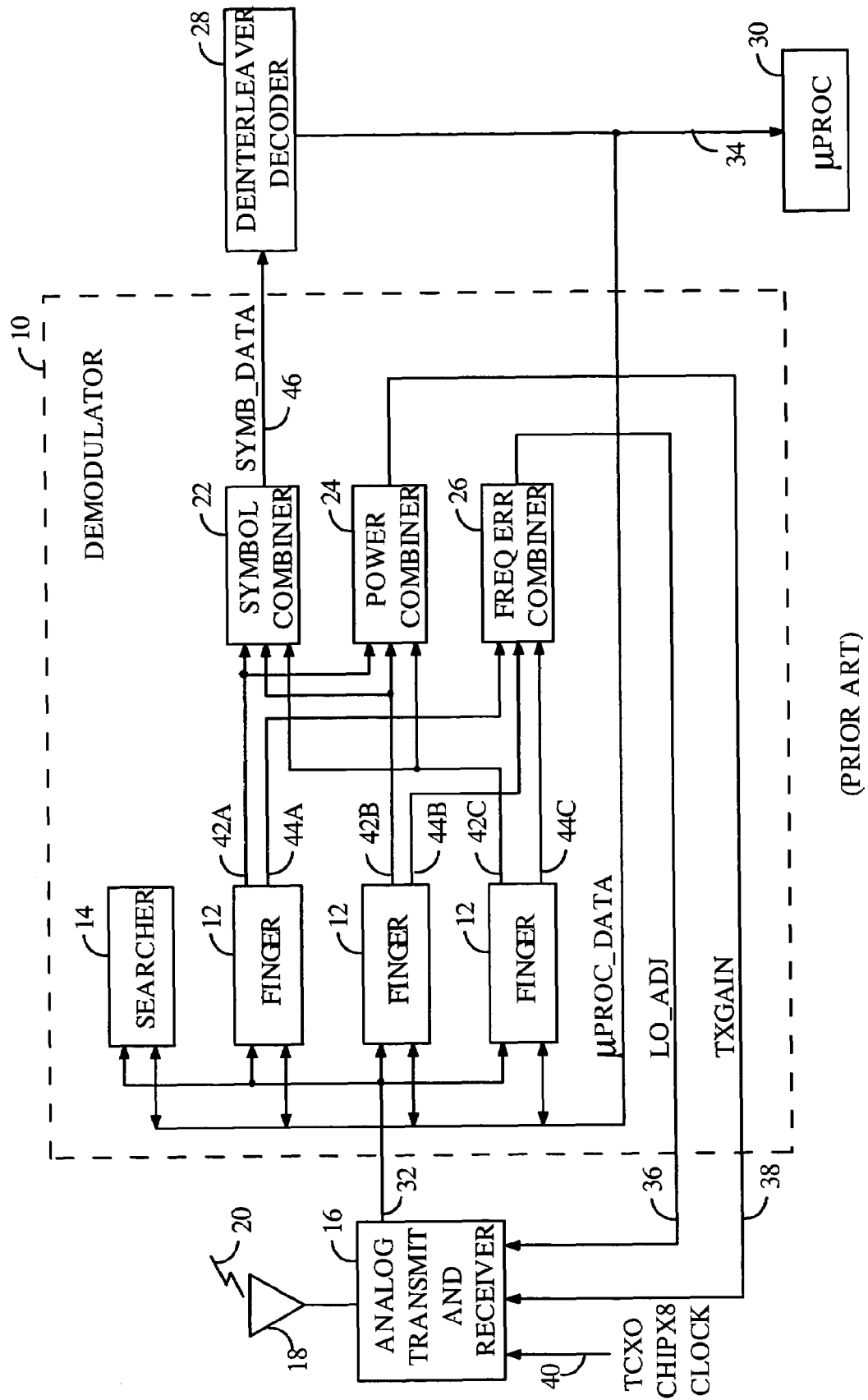
FIG. 2 is a block diagram of a demodulation system.
Figure 3:
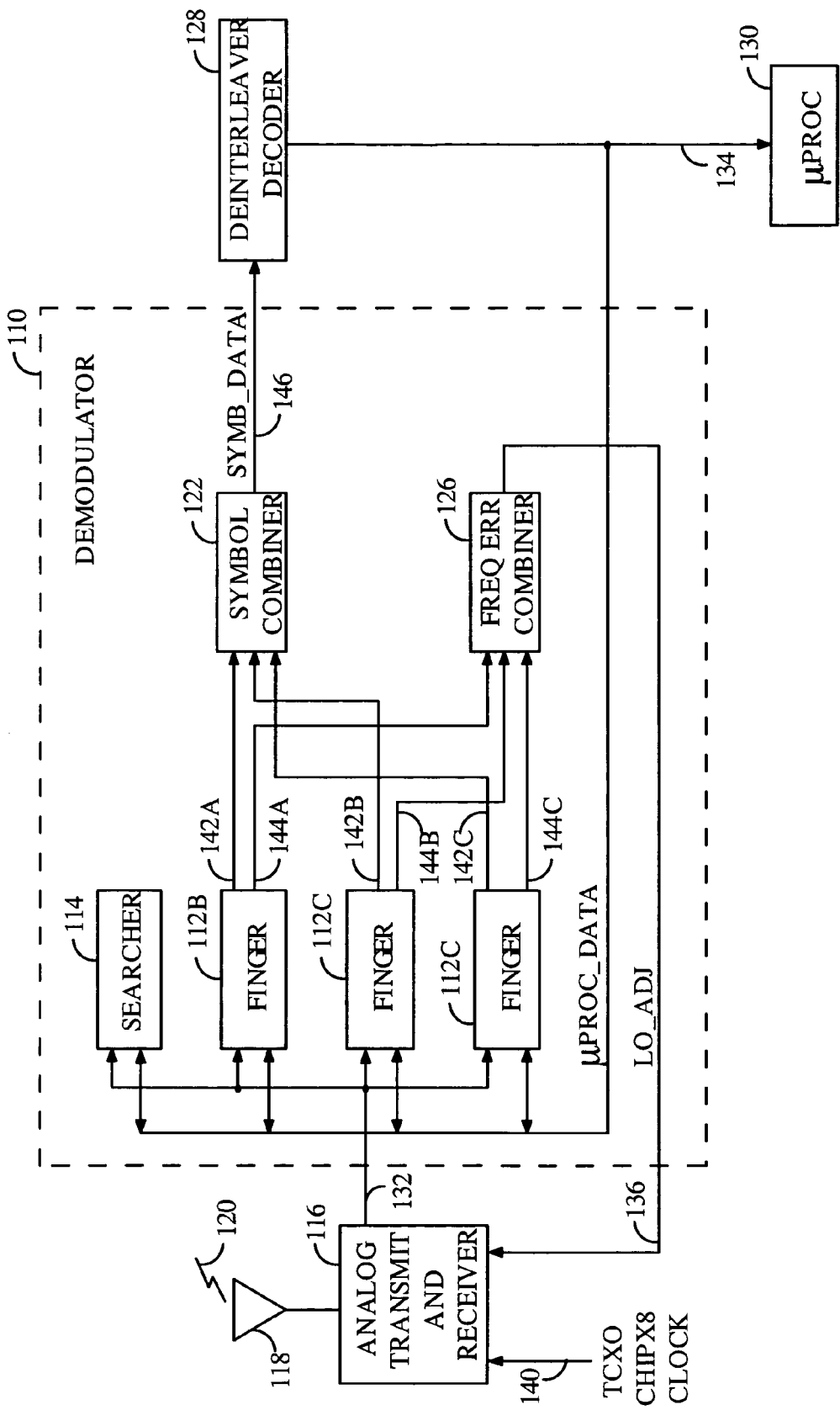
FIG. 3 is an illustration of the receiver structure that provides for effective demodulation of closely spaced multipath components.

In accordance with an embodiment, FIG. 2 is a block diagram of a demodulation system not suited for processing fat multipaths. A fat multipath exists when multipaths differ by less than a PN chip interval in time. In accordance with an embodiment, FIG. 3 is an illustration of a receiver structure that provides for effective demodulation of fat multipaths. It would be apparent to those skilled in the art that a demodulation system may have a myriad of structural forms known in the art. Common elements of embodiments include the fingers required to demodulate multipaths.

FIG. 2 depicts a generic rake receiver demodulator 10 for receiving and demodulating the forward link signal 20 arriving at the antenna 18. The analog transmitter and receiver 16 contain a QPSK downconverter chain that outputs digitized I and Q channel samples 32 at baseband. The sampling clock, CHIPX8 40, used to digitize the receive waveform, is derived from a voltage controlled temperature compensated local oscillator (TCXO).

The demodulator 10 is supervised by a microprocessor 30 through the databus 34. Within the demodulator, the I and Q samples 32 are provided to a plurality of fingers 12*a-c* and a searcher 14. The searcher 14 searches out windows of offsets likely to contain multipath signal peaks suitable for assignment of fingers 12*a-c*. For each offset in the search window, the searcher 14 reports the pilot energy it found at that offset to the microprocessor. The fingers 12*a-c* are then surveyed, and those unassigned or tracking weaker paths are assigned by the microprocessor 30 to offsets containing stronger paths identified by searcher 14.

Once a finger 12*a-c* has locked onto the multipath signal at its assigned offset it then tracks that path on its own until the path fades away or until it is reassigned using its internal time tracking loop. This finger time tracking loop measures energy on either side of the peak at the offset at which the finger is currently demodulating. The difference between these energies forms a metric which is then filtered and integrated.

The output of the integrator controls a decimator that selects one of the input samples over a chip interval to use in demodulation. If a peak moves, the finger adjusts its decimator position to move with it. The decimated sample stream is then despread with the PN sequence consistent with the offset to which the finger is assigned. The despread I and Q samples are summed over a symbol to produce a pilot vector (PI, PQ). These same despread I and Q samples are Walsh uncovered using the Walsh code assignment unique to the mobile user and the uncovered, despread I and Q samples are summed over a symbol to produce a symbol data vector (DI, DQ). The dot product operator is defined as $$P(n) \cdot D(n) = P_I(n) D_I(n) + P_Q(n) D_Q(n), \quad (2)$$

where $P_I(n)$ and $P_Q(n)$ are respectively the I and Q components of the pilot vector P for symbol n and $D_I(n)$ and $D_Q(n)$ are respectively the I and Q components of the data vector D for symbol n.

Since the pilot signal vector is much stronger than the data signal vector it can be used as an accurate phase reference for coherent demodulation; the dot product computes the magnitude of the data vector component in phase with the pilot vector. As described in U.S. Pat. No. 5,506,865, entitled "Pilot Carrier Dot Product Circuit" and assigned to the assignee of the present invention, the dot product weights the finger contributions for efficient combining, in effect scaling each finger symbol output 42*a-c* by the relative strength of the pilot being received by that finger. Thus the dot product performs the dual role of both phase projection and finger symbol weighting needed in a coherent rake receiver demodulator.

Each finger has a lock detector circuit that masks the symbol output to the combiner 42 if its long term average energy does not exceed a minimum threshold. This ensures that only fingers tracking a reliable path will contribute to the combined output, thus enhancing demodulator performance.

Due to the relative difference in arrival times of the paths to which each finger 12*a-c* is assigned, each finger 12*a-c* has a deskew buffer that aligns the finger symbol streams 42*a-c* so that the symbol combiner 22 can sum them together to produce a "soft decision" demodulated symbol. This symbol is weighted by the confidence that it correctly identifies the originally transmitted symbol. The symbols are sent to a deinterleaver/decoder circuit 28 that first frame deinterleaves and then forward error correction decodes the symbol stream using the maximum likelihood Viterbi algorithm. The decoded data is then made available to the microprocessor 30 or to other components, such as a speech vocoder, for further processing.

To demodulate correctly, a mechanism is needed to align the local oscillator frequency with the clock used at the cell to modulate the data. Each finger makes an estimate of the frequency error by measuring the rotation rate of the pilot vector in QPSK I, Q space using the cross product vector operator:

$$P(n) \times P(n-1) = P_I(n) P_Q(n-1) - P_I(n-1) P_Q(n) \quad (3)$$

The frequency error estimates from each finger 44*a-c* are combined and integrated in frequency error combiner 26. The integrator output, LO_ADJ 36, is then fed to the voltage control of the TCXO in the analog transmitter and receiver 16 to adjust the clock frequency of the CHIPX8 clock 40, thus providing a closed loop mechanism for compensating for the frequency error of the local oscillator.

As described above, in current demodulator structures, a path must differ by at least one PN chip to have a separate finger allocated to its demodulation. However, there are cases when paths differ by less than a PN chip interval in the time, this situation leads to the existence of a "fat path." Under traditional demodulator implementations, only one finger could be allocated to demodulate the fat path. One of the reasons for this is that once assigned to a path, the finger tracks the path movement independently. Without central coordination of the fingers multiple fingers will converge to the same peak of the fat path. In addition, the searcher tends to get confused when paths are tracked which are to close to one another.

On an orthogonal forward link, there is a great deal of energy in each of the paths because all of the energy from the base station to all mobiles is transmitted using the same PN offset which are channelized by use of orthogonal code sequences. Moreover, orthogonal code sequences have poor autocorrelation in that the correlation between orthogonal code sequences is high. Thus, when paths on the forward link differ by less than a PN chip interval, the signals cannot be distinguished from one another by the outer PN spreading nor is the coding gain of the orthogonal spreading realized because of the time shift. The energy of the close multipath components in this case serves as noise and substantially degrades the performance of the demodulator assigned to the fat path. On the reverse link, close multipath components can also cause degradation of the demodulator assigned to the fat path.

In accordance with an embodiment, FIG. 3 depicts a rake receiver demodulator 110 for receiving and demodulating the forward link signal 120 arriving at the antenna 118 of the present invention. The analog transmitter and receiver 116 contain a QPSK downconverter chain that outputs digitized I and Q channel samples 132 at baseband. In an exemplary embodiment, the sampling clock, CHIPx8 140, used to digitize the receive waveform, is derived from a voltage controlled temperature compensated local oscillator (TCXO).

The demodulator 110 is supervised by a microprocessor 130 through the databus 134. Within the demodulator, the I and Q samples 132 are provided to a plurality of fingers 112a-c and a searcher 114. Although the exemplary embodiment is described in terms of QPSK demodulation, the present invention is equally applicable to BPSK, QAM (Quadrature Amplitude Modulation), M-ary PSK or any known modulation method. The searcher 114 searches out windows of offsets likely to contain multipath signal peaks suitable for assignment of fingers 112a-c. For each offset in the search window, the searcher 114 reports the pilot energy it found at that window of offsets to the microprocessor 130. In the present invention, microprocessor 130 determines where to assign fingers and determines whether and where to assign a fat path demodulator.

Searcher 114 reports the energies in a window around peaks. Microprocessor 130 determines from the reported energies that peaks were narrow and could be successfully demodulated with a single path demodulator. Microprocessor 130 would also be able to identify a multipath component as a fat path and would assign for its demodulation the fat path demodulator. So for example, fingers 112a and 112b demodulate single paths. Finger 112c, on the other hand, are directed by microprocessor 130 to perform a fat path demodulation and would be assigned to demodulate the fat path.

When receive power consumption is dominated by the power consumption in the rake fingers, a system and method that reduces rake finger processing also significantly reduces power consumption.

The reduction in the power consumption comes about due to reduction in the fingers used in the Rake finger processing. To quantify this effect let T denote the power consumption in transmit mode which is assumed unchanged as the transmit power level is raised. The receive power consumption R is $$R=R_0+n*P_f,$$

where $R_0$ is the fixed part of receive power consumption that does not depend on the number of fingers used, n is the number of fingers that are active in the reception of the signal and $P_f$ is power consumption of a single finger. Thus, the reduction in receive power consumption is $\delta n*P_f$, where $\delta n$ is decrease in the number of fingers used. To get an estimate of $\delta n$, operational signal-to-noise ratio (SNR) needs to be low and the multipath power profile needs to be known by the terminal.

The total SNR obtained at the receiver is the sum of SNRs of the component signals obtained at each of the fingers. The post despreading SNR obtained at the ith finger locked on a path with signal level $h_i$ is shown below $$SNR_i = \frac{h_i}{((H-h_i)/PG+N)},$$

where $H=\Sigma_i h_i$ (i=1 . . . ktotal) where ktotal is the total number of multipaths, PG is the processing gain and N is the thermal noise power level. The term in the denominator is the effective noise plus interference after despreading.

If the operational pre-despreading SNR is low (i.e. PG>>1) and noise dominated, i.e., the noise power in the fingers being tracked N>>(H−$h_i$)/PG then a 3 dB increase in transmit power will increase $SNR_i$ by 3 dB. Since the modulation used is unchanged, the target SNR to be obtained by summing the signal at the fingers remains unchanged. This allows for a reduction in the number of fingers used. Since we are assuming a low pre-despreading SNR, the required number of fingers may be estimated by a captured energy metric. A captured energy metric, $E_{captured}$, in accordance with an embodiment is shown below.

$$E_{captured}=\Sigma_i h_i \text{ (i=1 . . . n) where n is the total number of fingers}$$

To get the same post-despreading SNR after the increase in transmit power we need to only add fingers until the captured energy reaches the same value as before an increase in the transmit power.

For example, assuming a multipath power profile is flat, i.e., the received energy is uniformly spread over M multipaths, and the transmit power is increased by 3 dB then the required number of fingers to obtain the same $E_{captured}$ is ½ the original number of fingers. If the receive power consumption is dominated by rake finger power consumption i.e., $$R_0<<n*P_f,$$

then the use of only ½ the number of fingers will results in a 50% reduction in power consumption. Therefore, in the case of a flat multipath power profile the best case power consumption reduction is the same as with intermittent transmission since a duty cycle of 0.5 would yield 50% reduction in power consumption. A method and apparatus for reducing power consumption by using an intermittent transmission rate is disclosed in U.S. patent application Ser. No. 10/859,411 entitled "MODIFIED POWER CONTROL FOR REDUCTION OF SYSTEM POWER CONSUMPTION," filed Jun. 1, 2004, which is assigned to the assignee of the present invention.

However, if the multipath power profile is more peaked with the total energy concentrated in the initial multipaths, then reducing the number of fingers can yield greater than 50% reduction in power consumption for a 3 dB increase in transmit power. For example, in simulations of channel models used for outdoor propagation, going from 80% to 40% energy capture can change the number of required paths from 60 to 15. Likewise, going from 80% to 40% energy capture can change the number of required paths from 175 to 40. Thus, if finger processing power consumption is dominant then these multipath profiles can yield approximately a 75% reduction in power consumption via a 3 dB increase in transmit power.

It would be apparent to those skilled in the art that the increase in transmit power can be other a 3 dB increase dependent on design considerations.

Figure 4:
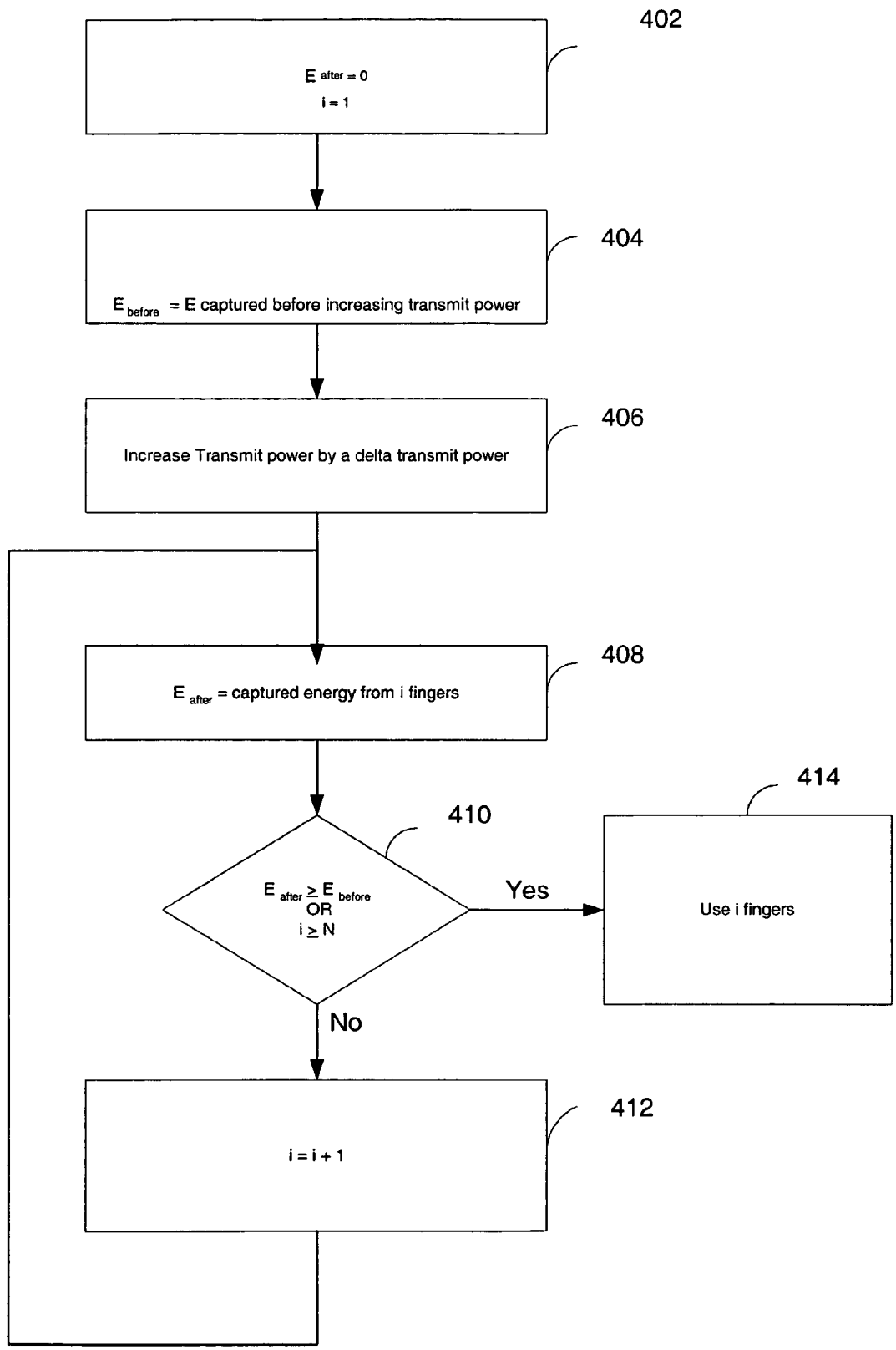
FIG. 4 shows a flowchart for determining the number of fingers to use in a rake receiver in accordance with an embodiment

FIG. 4 shows a flowchart for determining the number of fingers to use in a rake receiver in accordance with an embodiment. In step 402, $E_{after}$ and index i are initialized to zero and one, respectively. $E_{after}$ is the captured energy of the fingers as the algorithm illustrated by FIG. 4 steps through the iterations of the flowchart. In step 404, $E_{before}$ is set to $E_{captured}$ before an increase in transmit power. In step 406, transmit power is increased by a delta transmit power. In an embodiment, delta transmit power is 3 dB. In step 408, $E_{after}$ is set to the captured energy from i fingers.

In step 410, a check is made to determine whether $E_{after}$ is greater than or equal to $E_{before}$ or whether i is greater than or equal to N, where N is the number of fingers in a rake receiver. If both conditions are false, then the flow of control proceeds to step 412. Otherwise, the flow of control proceeds to step 414. In step 414, i fingers are used out of the N fingers in the rake receiver. It would be apparent to those skilled in the art that in an embodiment, the determination whether $E_{after}$ is greater than or equal to $E_{before}$ does not have to be exact. The determination can be whether $E_{after}$ is about greater than or equal to $E_{before}$ depending on the embodiment and/or design considerations.

In step 412, i is incremented and the flow of control proceeds to step 408.

In systems that use a closed loop power control signaling mechanism, the method of FIG. 4 is equivalent to the receiver changing the outer loop set point by the delta increase in transmit power and then after a delay returning the outer loop set point to the original value while retaining a smaller set of fingers. While this procedure can be initiated autonomously by the receiver design considerations may suggest that this decision needs to be made at a system level rather than independently by the receiver.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or combination thereof designed to perform the functions described herein. A general-purpose processor may be a microprocessor, but in the alternative, the processor may be a conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable a person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of reducing the number of fingers in a rake receiver, comprising:
   determining $E_{before}$, captured energy of all fingers before increasing transmit power;
   increasing transmit power by a delta transmit power;
   determining $E_{after}$, captured energy of i fingers; and
   determining i fingers needed for processing, such that $E_{after}$ is essentially greater than or equal to $E_{before}$.

2. The method of claim 1, wherein the delta transmit power is 3 dB.

3. The method of claim 1, wherein the delta transmit power is based on a desired reduction in receive power consumption.

4. The method of claim 1, wherein the delta transmit power is based on a signal-to-interference-and-noise ratio (SINR).

5. The method of claim 1, wherein the delta transmit power is based on a multipath power profile.

6. A wireless terminal, comprising:
   means for determining $E_{before}$, captured energy of all fingers before increasing transmit power;
   means for increasing transmit power by a delta transmit power;
   means for determining $E_{after}$, captured energy of i fingers; and
   means for determining i fingers needed for processing, such that $E_{after}$ is essentially greater than or equal to $E_{before}$.

7. Computer readable media embodying a program of instructions executable by a computer program, said computer readable media comprising:
   a computer readable program code means for determining $E_{before}$, captured energy of all fingers before increasing transmit power;
   a computer readable program code means for increasing transmit power by a delta transmit power;
   a computer readable program code means for determining $E_{after}$, captured energy of i fingers; and
   a computer readable program code means for determining i fingers needed for processing, such that $E_{after}$ is essentially greater than or equal to $E_{before}$.

* * * * *